(12) United States Patent
Goetzmann et al.

(10) Patent No.: US 11,394,163 B2
(45) Date of Patent: Jul. 19, 2022

(54) ELECTRIC LINE ASSEMBLY WITH DIRECT CONTACTING AND METHOD FOR PRODUCING SAME

(71) Applicant: Lisa Dräxlmaier GmbH, Vilsbiburg (DE)

(72) Inventors: Christoph Goetzmann, Vilsbiburg (DE); Klaus Specht, Geisenhausen (DE); Christoph Forstmeier, Landshut (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 66 days.

(21) Appl. No.: 16/755,581

(22) PCT Filed: Oct. 8, 2018

(86) PCT No.: PCT/EP2018/077315
§ 371 (c)(1),
(2) Date: Apr. 12, 2020

(87) PCT Pub. No.: WO2019/072760
PCT Pub. Date: Apr. 18, 2019

(65) Prior Publication Data
US 2020/0266595 A1    Aug. 20, 2020

(30) Foreign Application Priority Data

Oct. 13, 2017  (DE) .......................... 102017123864.6

(51) Int. Cl.
*H01R 43/02*  (2006.01)
*B23K 20/12*  (2006.01)
(Continued)

(52) U.S. Cl.
CPC ....... *H01R 43/0207* (2013.01); *B23K 20/129* (2013.01); *H01R 4/023* (2013.01);
(Continued)

(58) Field of Classification Search
CPC .... H01R 43/0207; H01R 43/16; H01R 4/023; B23K 20/129
(Continued)

(56) References Cited

U.S. PATENT DOCUMENTS 2,794,176 A * 5/1957 Barnes .................... H01R 4/029
                                                         439/874
3,656,092 A * 4/1972 Swengel, Sr. .......... H01R 4/029
                                                         439/730
(Continued)

FOREIGN PATENT DOCUMENTS

| DE | 102013101876 | 6/2015 |
| JP | 2005129498 | 5/2005 |
| WO | WO2012/139793 | 10/2012 |

OTHER PUBLICATIONS

English language translation of: JP2005129498.
English language translation of: DE102013101876.
English language translation of: WO2012/139793.

*Primary Examiner* — Peter G Leigh
(74) *Attorney, Agent, or Firm* — Jacob Eisenberg

(57) ABSTRACT

The disclosure sets out a method for producing an electrical line arrangement by integrally joining a free end of an electrical conductor to a metal component. The method includes reshaping a section of the metal component to form a receiving sleeve, inserting the conductor into the receiving sleeve, attaching a friction welding tool to the receiving sleeve, and moving the friction welding tool relative to the metal component and/or the conductor for generating welding energy for at least partially melting a portion facing the conductor, e.g. an inner wall, the metal component and/or the conductor.

17 Claims, 2 Drawing Sheets

(51) Int. Cl.
  *H01R 4/02* (2006.01)
  *H01R 43/16* (2006.01)
  *B23K 101/38* (2006.01)
(52) U.S. Cl.
  CPC .......... *H01R 43/16* (2013.01); *B23K 2101/38* (2018.08); *H01R 2201/26* (2013.01)
(58) Field of Classification Search
  USPC ........................................................ 439/874
  See application file for complete search history.

(56) References Cited

U.S. PATENT DOCUMENTS

| | | | | |
|---|---|---|---|---|
| 3,728,781 A * | 4/1973 | Curtis | .................... | H01R 4/029 |
| | | | | 228/113 |
| 4,196,960 A * | 4/1980 | Gelfand | ................. | H01R 11/12 |
| | | | | 439/874 |
| 4,317,277 A * | 3/1982 | Bennett | ................ | B23K 11/163 |
| | | | | 174/94 R |
| 4,394,533 A * | 7/1983 | Naito | .................. | B23K 11/364 |
| | | | | 156/50 |
| 4,553,809 A * | 11/1985 | Holt | ....................... | H01R 4/024 |
| | | | | 174/84 R |
| 6,293,594 B1 * | 9/2001 | Safarevich | ............... | A61N 1/05 |
| | | | | 174/84 R |
| 6,538,203 B1 * | 3/2003 | Nolle | ....................... | H01R 4/62 |
| | | | | 174/84 C |
| 6,759,594 B2 * | 7/2004 | Iijima | .................... | G01P 1/026 |
| | | | | 174/135 |
| 6,851,956 B2 * | 2/2005 | Saka | ...................... | H01R 9/226 |
| | | | | 439/76.2 |
| 7,000,470 B2 * | 2/2006 | Iijima | .................... | G01P 1/026 |
| | | | | 29/860 |
| 7,828,610 B2 * | 11/2010 | Lehmann | ............... | H01R 4/187 |
| | | | | 439/874 |
| 8,840,437 B2 * | 9/2014 | Hentschel | .............. | H01R 4/029 |
| | | | | 439/874 |
| 9,225,076 B2 * | 12/2015 | Froeschl | .................. | H01R 4/20 |
| 9,379,460 B2 * | 6/2016 | Miyamoto | ........... | H02G 15/046 |
| 9,452,490 B2 * | 9/2016 | Dudziak | ............. | B23K 15/0093 |
| 9,525,215 B2 * | 12/2016 | Kawamura | ........... | H01R 43/048 |
| 9,531,088 B2 * | 12/2016 | Kihara | ..................... | H01R 4/20 |
| 9,548,545 B2 * | 1/2017 | Yagi | ..................... | B23K 26/0846 |
| 9,564,691 B2 * | 2/2017 | Yagi | ...................... | H01R 4/183 |
| 9,728,927 B2 * | 8/2017 | Kovacs | ............ | H01R 13/65912 |
| 2006/0292922 A1 * | 12/2006 | Froschl | ................... | H01R 4/625 |
| | | | | 439/442 |
| 2009/0249616 A1 * | 10/2009 | Froschl | ................... | H01R 4/029 |
| | | | | 29/745 |
| 2011/0177727 A1 * | 7/2011 | Zhao | ........................ | H01R 4/72 |
| | | | | 439/874 |
| 2013/0206473 A1 * | 8/2013 | Gottschlich | ............ | H02G 15/00 |
| | | | | 174/75 R |
| 2015/0064991 A1 * | 3/2015 | Kawamura | ........... | H01R 4/029 |
| | | | | 439/879 |

\* cited by examiner

ELECTRIC LINE ASSEMBLY WITH DIRECT CONTACTING AND METHOD FOR PRODUCING SAME

CROSS REFERENCE TO RELATED APPLICATIONS

This application is a national phase application of International Application No. PCT/EP2018/075562, filed on Sep. 21, 2018, and claims the priority benefit of German Application 102017122008.9, filed on Sep. 22, 2017, the content of both of which is incorporated herein by reference.

TECHNICAL FIELD

The present disclosure relates to a method for producing an electrical line arrangement by integrally joining a free end of an electrical conductor to a metal component. The disclosure further relates to an electrical line arrangement as such. In particular, a direct contact between the conductor and the metal component is provided.

BACKGROUND

Particularly in motor vehicles, lightweight aluminum conductors are often used in electrical line arrangements, the conductors being difficult to mechanically connect due to the difficult flow behavior of the aluminum. As, for example, in known crimping processes for connecting a conductor with an electrical contact part as an intermediate part to a counterpart of the conductor, the aluminum of the conductor can yield to such a degree, within the product life cycle of the line arrangement, by its flow behavior, that the contact part undesirably loosens. That is why it is becoming more common that a recess of the contact part provides a direct contact between the conductor and the counterpart of the line arrangement.

However, direct contacting of the aluminum conductor with the counterpart is also difficult, since this is often accomplished by using ultrasonic welding processes. On the one hand, these ultrasonic welding processes can only be carried out indirectly via a few monitor process parameters which have a negative impact on process security and can result in a corresponding quality check. On the other hand, introducing the ultrasound into a line arrangement can also have a disadvantageous effect in that other components are loosened or at least damaged as a result of the ultrasound-induced vibrations.

In addition to the ultrasonic welding process, friction welding processes are known, as for example from DE 10 2013 101 876 B3, wherein a stranded wire, in particular with a stranded conductor, may be cohesively bonded with an electrical contact part. In the case of a stranded conductor, a bundle of individual strands is introduced into an accommodating sleeve of the contact part via an inlet opening. Then, between at least a number of the individual strands, along with the inner wall of the receiving sleeve, welding energy is fed by means of a friction welding tool. Although high-quality welded connections can be reliability made with a high degree of process reliability, direct contact with a counterpart of the conductor, without the contact part itself, would be desirable.

SUMMARY

In view of limitations in the related art, an object of certain embodiments of the disclosure may be to provide a possibility for direct contacting of a conductor with a counterpart using means that are structurally simple.

The above and other objects may be attained by implementations consistent with the independent claim. Advantageous embodiments of the invention are set out in the dependent claims, the description and the accompanying figures.

Objects and advantages of the disclosed embodiments may be realized and attained by the elements and combinations set forth in the claims. However, embodiments of the present disclosure are not necessarily required to achieve such, exemplary objects and advantages, and some embodiments may not achieve any of the stated objects and advantages.

A method set out in the disclosure is suitable for producing an electrical line arrangement by integrally joining, preferably, two joining partners. The integral connection takes place at least between an electrical conductor and an electrically conductive metal component which in principle serves as a further conductor. The method comprises the following steps:

Reshaping a section of the metal component to form a receiving sleeve. In other words, the receiving sleeve is made from the metal material of the metal component molded into one piece with it. The shaping can be carried out by a suitable forming process. This means that no additional components are required to form the receiving sleeve.

Inserting the conductor into the receiving sleeve. In the case of an insulated electrical line, the conductor can be exposed beforehand by stripping. Preferably, a free end of the conductor can be inserted, for example, by insertion into the receiving sleeve.

Attaching a friction welding tool to the receiving sleeve. Accordingly, the friction welding tool can also be at least partially introduced into the receiving sleeve. The friction welding tool, which may be for example, a mandrel, a cylinder or the like, may preferably cooperate, by means of friction stir welding, with, for example, one or more workpiece holders that fix the metal component and the line.

Moving the friction welding tool relative to the metal component and/or the conductor for generating welding energy for at least partially melting a portion facing the conductor, e.g. an inner wall, the metal component and/or the conductor. By the relative movement of the friction welding tool to one or both of the joining partners, friction is created as a result of which the respective material of the joining partner is melted or sufficiently plasticized and the two joining partners can be bonded together.

The method as set out in the disclosure thus offers several advantages. As a result of direct contact being made between the conductor and the metal component, an additional intermediate or contact part, such as a cable lug or the like, is no longer necessary.

Furthermore, due to a resulting gas-tight cohesive connection between the joining partners, different metal materials can also be joined together, such as, for example, an aluminum metal component with a copper conductor. Preferably, the receiving sleeve is still open on one side or at least visible after the cohesive joining, so that the joining area can be checked optically, as, for example, by a camera system with electronic evaluation of the joining area. Due to the comparatively simple tool design and the low energy consumption, the process is cost-effective, as well as allows for a robust line arrangement.

In some embodiments, a further development of the invention is that the receiving sleeve protrudes from a flat side of the metal component. The metal component can be in the form of a plate or sheet-shaped with a basically flat cuboid shape, so that there are two opposite narrow sides and two opposite wide or flat sides. Preferably, the receiving sleeve is formed from a material section on the flat side. In other words, the receiving sleeve can also be formed by forming the flat side. Among other things, this offers the advantage that there is enough raw material and other material available to form the receiving sleeve with the same material-uniformity with the metal component. The length extension of the receiving sleeve from the flat side depends upon, among other things, the material thickness of the metal component before forming and the wall thickness of the receiving sleeve after forming. Advantageously, for a large-area cohesive connection, the receiving sleeve extends away from the flat side in the centimeter range.

The receiving sleeve can be cylindrical, especially in the case of a conductor designed as a round conductor, in order to achieve the fullest possible contact of the conductor with the receiving sleeve. Especially on the inside it can thus have a (circular) round cross section.

In order to be able to provide the line arrangement in a cost effective manner, the receiving sleeve can be formed by deep drawing or extrusion. The tool design is simple in each case and the design freedom with regard to the choice of material and the geometry of the receiving sleeve are extensive with these forming processes.

In order to achieve a good cohesive connection with a structurally simple structure of the friction welding tool, the conductor can be aligned approximately flush with a free end edge of the receiving sleeve while the friction welding tool is being moved.

To achieve a best possible contact between the conductor and the inner wall of the receiving sleeve and to support the melting of the joining partners during the formation of the bond, the conductor and the receiving sleeve can be pressed together.

In some embodiments, the free end of the conductor connects to the receiving sleeve, so that the conductor can be inserted into the receiving sleeve from an open, first end face and the friction welding tool from a second end face opposite the latter.

Another embodiment of the present disclosure may be found when the metal component is an electrical flat conductor with a solid or at least flexural rigid metal core. The flat conductor can also be electrically insulated, at least in sections, with an insulation sheath, it being possible for this to be removed preferably before the forming and, because of the dielectric strength, have an insulation layer thickness of 0.15 to 2.5 mm, preferably 0.3 to 0.7 mm. The metal core width to the metal core height can be of a ratio of 7:1 to 60:1 at a metal core height of 0.5 to 2.5 mm, preferably 1.0 to 2.0 mm. The flat conductor can be manufactured in a rolling or extrusion process. As a material, aluminum with a degree of purity of greater than or equal to 99.5% has proven to be suitable, whereby a copper material can also be advantageously used. In any case, the direct contacting saves one contact part or a plug connection as an intermediate part.

Alternatively, the present disclosure can also be applied if the metal component is a sheet-shaped busbar designed as a stamped/bent part. Such may be found, for example, in power distribution boards or fuse boxes of motor vehicles. A material in sheet form is particularly suitable for forming, as comparatively little energy is required. Here, too, the advantage is that direct contact to the busbar can be made.

Alternatively, it is also possible that the metal component is a housing section. This means that even a housing can be contacted directly if it fulfills an electrical function.

Due to the frequency of use, it has proved useful in practice if the conductor is a round conductor, preferably a stranded conductor. This no longer needs to be provided or assembled with a contact part, so that this process step may be completely eliminated. Round conductors made of solid material or with strands are often used in motor vehicles to supply electrical loads, so that a large number of contact parts can also be saved with the direct contacting as described above.

Due to the integral, airtight or gastight connection, friction welding is well suited for different material combinations, especially for material combinations with a positive and negative position in the electrochemical voltage series. Therefore, the disclosure can be applied particularly advantageously if the conductor or the metal component is made of a copper material and the other joining partner is made of an aluminum material.

To set the contact or protect the joint area between the conductor and the metal component, in particular from mechanical influences, and, if necessary, also to be electrically isolated from the outside, the receiving sleeve with the conductor attached to it can be encased in a dimensionally stable plastic material. In other words, a housing can be arranged around this area. This can be manufactured separately as an injection molded part and then attached to the metal component and/or the conductor, for example, by means of snap-in connection or similar around the area.

In still other embodiments, housing may be in a plastic material if the receiving sleeve and the conductor are overmolded with the plastic material. For this purpose, the line arrangement can be converted at least in sections into for example an injection molding tool and be overmolded with the plastic material.

The present disclosure also relates to an electrical line arrangement which can preferably be manufactured in one or more of the design variants described above. In particular, this has the metal component from which at least one receiving sleeve is formed in one piece. In addition, the line arrangement has at least one electrical conductor, which is arranged at least in sections in the receiving sleeve and is integrally connected to it by a material bond.

BRIEF DESCRIPTION OF THE FIGURES

Further advantages, features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

In the following, advantageous examples of the invention are explained with reference to the accompanying figures, wherein.

The figures are merely schematic representations and serve only to explain the various embodiments of the disclosure. Identical or similar acting elements are consistently marked with the same reference numerals.

DETAILED DESCRIPTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
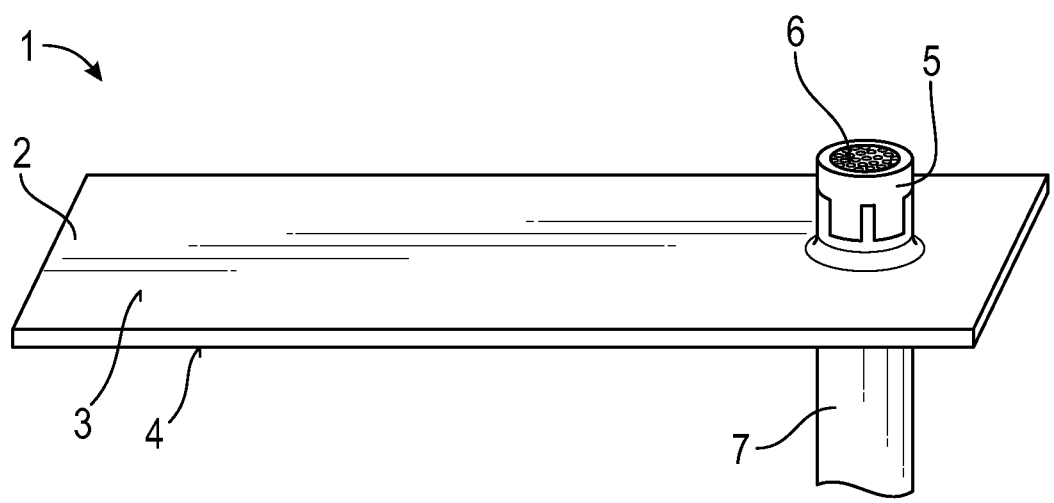
FIG. 1 depicts an electrical line arrangement according to an embodiment with a direct contact of an electrical conductor to a flat metal component.

FIG. 1 depicts a perspective view of an electrical line arrangement 1, which may be particularly suitable for use in motor vehicles. The line arrangement 1 is plate-shaped and at least in the section shown comprises a flat metal component 2, and, which, in this design, may for example be a flat conductor with a solid or rigid metal core made of an aluminum material. In a motor vehicle, this may serve as a central power supply which extends in a longitudinal direction with respect to the motor vehicle, is powered by a motor vehicle battery, and accordingly may supply a number of electrical loads.

The metal component 2 includes two opposing wide or narrow flat sides 3 and 4 as a base and a top surface along with vertical narrow sides (not shown).

A receiving sleeve 5 may be formed directly from and in one piece with the aluminum material of the metal component 2 by a shaping method described in more detail below, which here may extend, in a form of a hollow cylindrical, vertically away from the flat side 4 (upper site in FIG. 1) of the metal component 2. The receiving sleeve 5 may be open at its end faces and thus forms a through opening in the thickness direction of the metal component 2. Due to the forming process used herein, the wall thickness of the receiving sleeve 5 may be at least slightly less than the material thickness of the metal component 2 around receiving sleeve 5.

An electrical conductor 6 of an electrical line is accommodated in sections in the receiving sleeve 5 of the metal component 2, namely with its free end, whereby the conductor 6 here is a stranded conductor made of a copper material. The electrical line with the conductor 6 also has an insulating jacket 7, which is removed by stripping in the area of the receiving sleeve 5 to ensure direct electrical contact between an inner wall of the receiving sleeve 5 and the conductor 6. The conductor 6 is pressed with the receiving sleeve 5 and may be integrally connected, as will be described in more detail below.

Although only a single receiving sleeve 5 is shown here as an example, the metal component 2 can also have a plurality of receiving sleeves 5, in each of which a conductor 6 is received. In the case of a flat conductor, the metal component 2 can have a length of several meters and thus serve to supply a large number of electrical loads.

Figure 2:
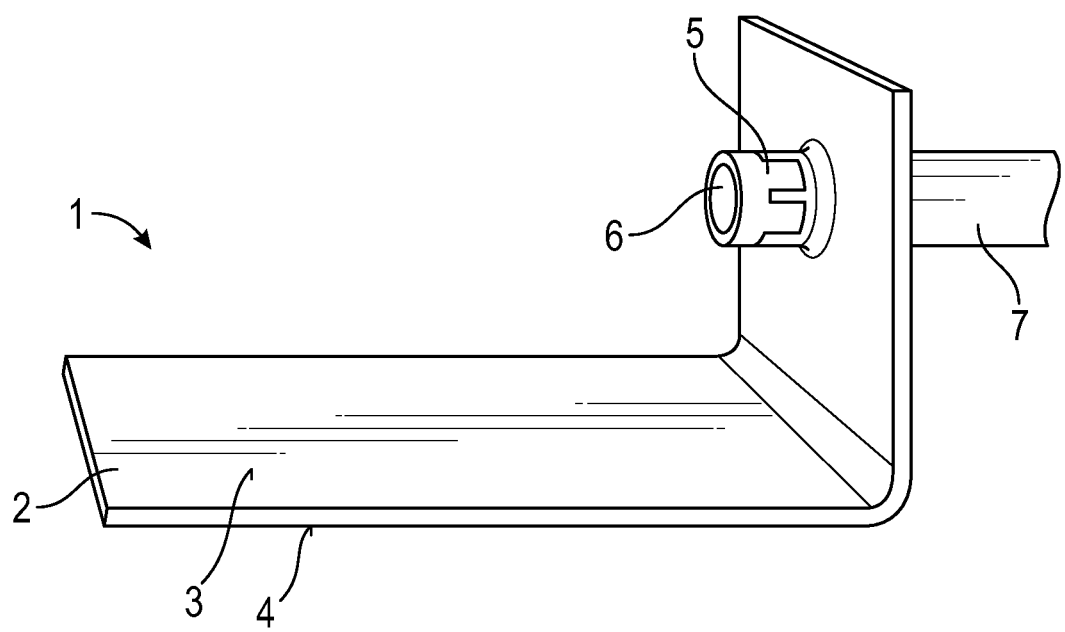
FIG. 2 depicts a further example of a line arrangement in accordance with the embodiment.

FIG. 2 depicts a perspective view of another example of the design of line arrangement 1, in which the metal component may not be consistently flat. Rather, the metal component 2 has an angle, which, here, by way of example, is only 90°. Deviating from this, it is feasible within this design that the metal component 2 has a wave shape or similar formation, especially over its longitudinal extension. In this example design, the receiving sleeve 5, which in turn is formed directly from the aluminum material of the metal component 2, also extends away from the flat side 4, which here, however, has several sections angled towards each other due to the aforementioned angle.

Figure 3:
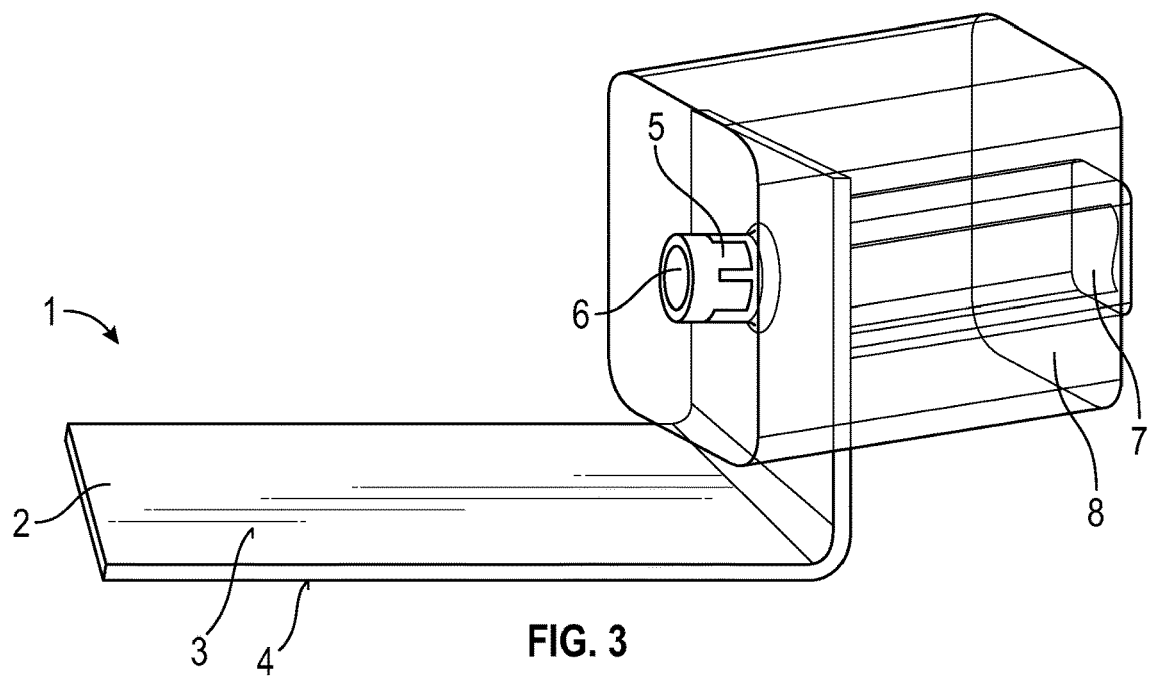
FIG. 3 depicts the line arrangement from FIG. 2, where a receiving sleeve and a conductor connected to it are housed in a plastic housing.

FIG. 3 depicts embodiment of the line arrangement 1. As shown, a housing 8 is made of a plastic material, for example, a thermoplastic. The housing 8 essentially surrounds the receiving sleeve 5 and the section of the conductor 6 accommodated therein, in order to protect the direct contact area there primarily from mechanical influences. In this embodiment, the housing 8 is held on the metal component 2 by a latching connection (not shown in detail), for which purpose the latter has a recess for engaging with a latching lug of the housing 8 (also not shown). Although the line arrangement 1 here is provided with the angle described above, other angles may be envisioned to the skilled person such that the housing 8 or the plastic material can also be provided in case of a flat or corrugated design of the metal component.

Figure 4:
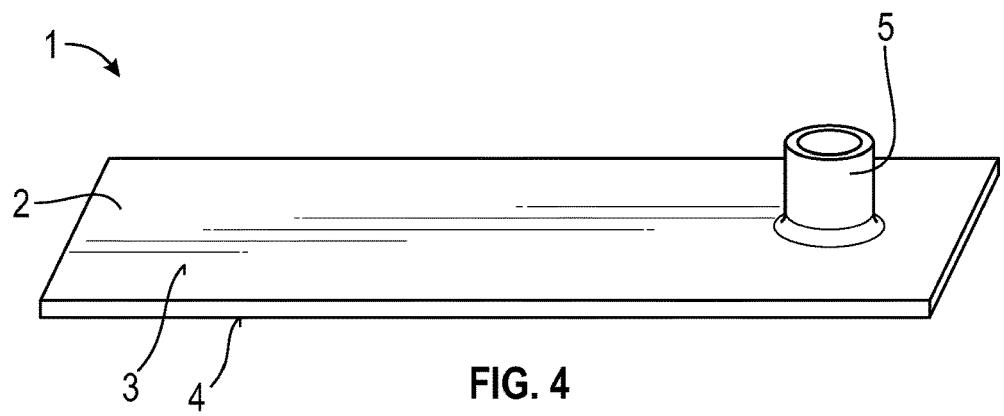
FIG. 4 depicts a flat metal component of the line arrangement from FIG. 1, in which a receiving sleeve is designed through forming.
Figure 5:
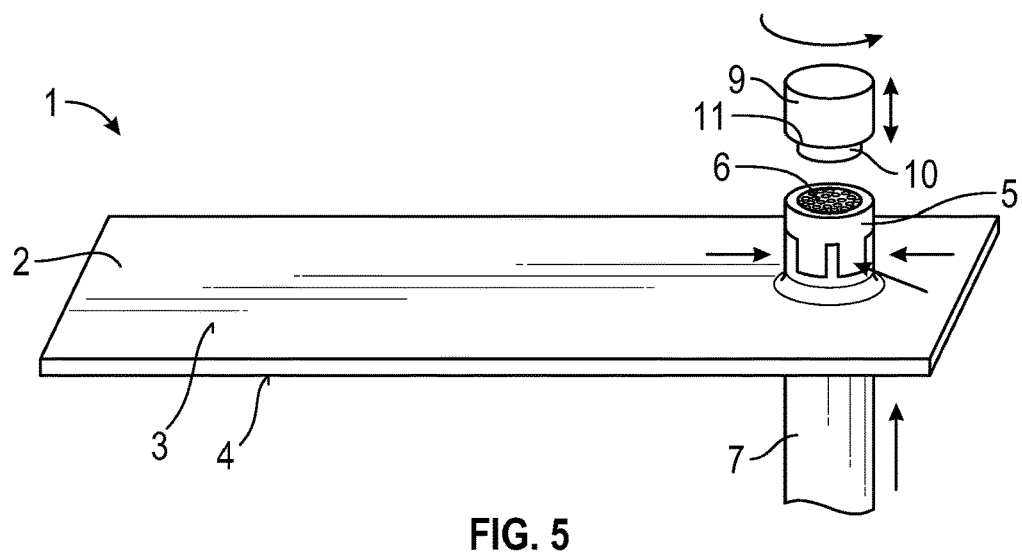
FIG. 5 depicts the line arrangement from FIG. 1, where a conductor is placed in a receiving sleeve and a friction welding tool is attached.

The manufacture of the line arrangement 1 according to the various embodiments described herein may be carried out as described below with general reference to FIGS. 4 and 5.

Initially, the metal component 2 may be provided as a blank with a metal core consisting of the aluminum material. From this, the receiving sleeve 5 is directly formed by a forming process, such as deep drawing or extrusion, such that the receiving sleeve 5 is formed in one piece with the metal component 2. The forming tool used for this is known to those skilled in the art and is not shown here for the sake of clarity and brevity.

Then the conductor 6, stripped at its free end, is inserted from the lower flat side 3 (bottom in FIG. 4 or 5) into the receiving sleeve 5, and then the receiving sleeve 5 is pressed together radially with a (not shown) pressing tool, as indicated by arrows. The conductor 6 can be flush with one (in FIG. 5 upper) end edge of the receiving sleeve 5.

Finally, a friction welding tool 9 is brought up to the conductor 6 and the receiving sleeve 5 in the direction indicated by the arrow. In this design example, the friction welding tool 9 has a pin 10, which protrudes over a radially wider shoulder 11 and can thus, at the latest after an initial melting of the conductor 6, dip into the receiving sleeve 5 while the shoulder 11 lies on the end edge of the receiving sleeve 5. This is done under pressure. Then the friction welding tool 9 is rotated for a few seconds relative to the conductor 6 and the receiving sleeve 5, whereby of which at least one of the materials is plasticized and the integral connection between the two joining partners is produced. The diameter of the pin 10 and the shoulder 11 are adapted to the cross-section of the receiving sleeve 5, respectively the wall thickness.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A method for producing an electrical line arrangement of a motor vehicle by integrally joining a free end of an electrical conductor to a metal component of the electrical line arrangement, the method comprising the steps:
   forming a partial section of the metal component to form a receiving sleeve,
   inserting the conductor into the receiving sleeve,
   attaching a friction welding tool to the receiving sleeve,
   moving the friction welding tool relative to at least one of the metal component and the conductor for generating welding energy for at least partially melting a portion facing at least one of the conductor, an inner wall, the metal component and the conductor, and
   wherein the electrical line arrangement is configured to serve as a central power supply of the motor vehicle.

2. The method according to claim 1, wherein the receiving sleeve protrudes from a flat side of the metal component.

3. The method according to claim 1, wherein the receiving sleeve is cylindrical.

4. The method according to claim 1, wherein the receiving sleeve is formed by means of deep drawing or extrusion.

5. The method according to claim 1, wherein the conductor is aligned, while the friction welding tool is moving, approximately flush with a free end edge of the receiving sleeve.

6. The method according to claim 1, further comprising the step of pressing the conductor and the receiving sleeve together.

7. The method according to claim 1, further comprising the steps of:
   inserting the conductor into the receiving sleeve from an open, first end face; and
   inserting the friction welding tool into the receiving sleeve from a second end face opposite thereto.

8. The method according to claim 1, wherein the metal component is a flat electrical conductor with a solid core.

9. The method according to claim 1, wherein the metal component is a sheet-shaped busbar having at least one of a stamped part and a bent part.

10. The method according to claim 1, wherein the metal component is a housing section.

11. The method according to claim 1, wherein the conductor is at least one of a round conductor and a stranded conductor.

12. The method according to claim 1, wherein the conductor or the metal component comprises a copper material and an other joining partner comprises an aluminum material.

13. The method according to claim 1, further comprising the step of encasing the receiving sleeve with the conductor attached thereto with a dimensionally stable plastic material.

14. The method according to claim 13, further comprising the step of overmolding the receiving sleeve and the conductor with the plastic material.

15. An electrical line arrangement for a motor vehicle, the electrical line arrangement comprising:
   a metal component having a partial section formed as a receiving sleeve;
   a conductor inserted into and integrally connected to the receiving sleeve; and
   wherein the receiving sleeve is made from the metal material of the metal component and is molded into one piece with it,
   wherein the conductor is friction welded into the receiving sleeve; and
   wherein the electrical line arrangement is configured to serve as a central power supply of the motor vehicle.

16. The electrical line arrangement according to claim 15, wherein the line arrangement is configured and arranged to be powered by a battery of the motor vehicle battery and supply power to a number of electrical loads of the motor vehicle.

17. The method according to claim 1, further comprising the steps of:
   arranging the line arrangement to be powered by a battery of the motor vehicle; and
   arranging the line arrangement to supply power to a number of electrical loads of the motor vehicle.

* * * * *